United States Patent [19]

Oku et al.

[11] Patent Number: 4,858,030

[45] Date of Patent: Aug. 15, 1989

[54] REPRODUCING APPARATUS OF A VIDEO DISC PLAYER

[75] Inventors: Masuo Oku, Kamakura; Yoshimichi Kudo, Yokohama; Tomomitsu Kuroyanagi, Katsuta; Kazuo Kondo, Hujisawa; Hisanobu Tsukazaki; Tetsuya Ikeda, both of Yokohama; Akio Nakashima; Takashi Kimura, both of Yokohama, all of Japan

[73] Assignees: Hitachi, Ltd.; Hitachi Video Engineering, Inc., both of Tokyo, Japan

[21] Appl. No.: 87,706

[22] Filed: Aug. 21, 1987

[30] Foreign Application Priority Data

Aug. 22, 1986 [JP] Japan ................................ 61-195391
Aug. 27, 1986 [JP] Japan ................................ 61-198878

[51] Int. Cl.⁴ ............................................ H04N 5/76
[52] U.S. Cl. .................................... 358/342; 360/10.1; 358/312
[58] Field of Search ............... 358/312, 324, 342, 907; 360/10.1

[56] References Cited

U.S. PATENT DOCUMENTS 4,477,843 10/1984 Kinjo et al. ................. 360/10.1 X
4,554,597 11/1985 Sugiyama et al. .................. 358/335
4,635,134 1/1987 Sasamura et al. .................. 358/312
4,733,312 3/1988 Morimoto .......................... 360/10.1

Primary Examiner—James B. Mullins
Attorney, Agent, or Firm—Antonelli, Terry & Wands

[57] ABSTRACT

A reproducing apparatus of a video disc player, wherein for a special reproduction such as a fast forward reproduction, or a reverse reproduction from a CLV disc, a field memory is provided for storing video signals of length of one field. A reading-in operation to the field memory is synchronized with a reproduced synchronizing signal. A writing-out operation from the field memory is synchronized with a reference synchronizing signal. A discontinuity of phase caused by a track jump is eliminated, and a stabilized picture on a TV monitor can be provided.

19 Claims, 11 Drawing Sheets

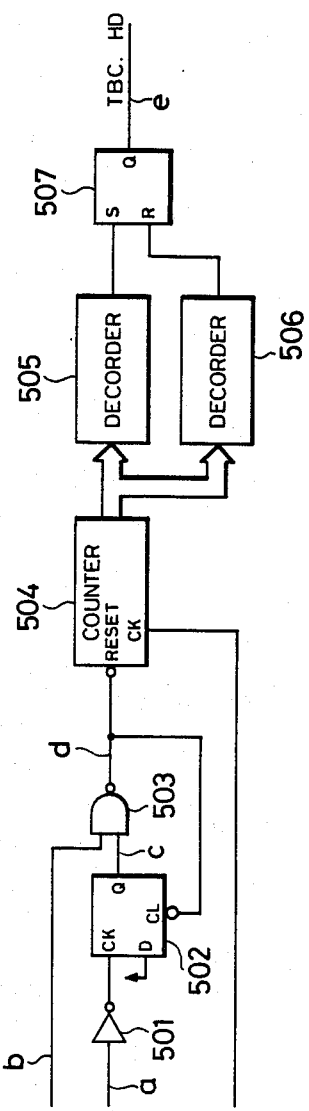

FIG. 7
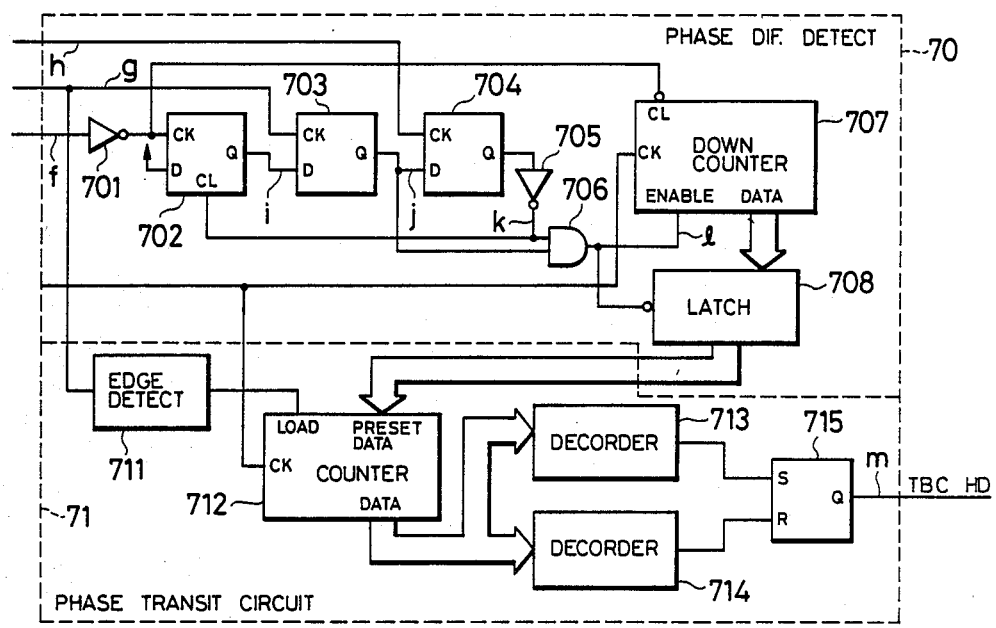
| FIG. 8A | TRACK CROSS | f |  |
| FIG. 8B | HD | g |  |
| FIG. 8C | HD | h |  |
| FIG. 8D | | i |  |
| FIG. 8E | | j |  |
| FIG. 8F | | k | 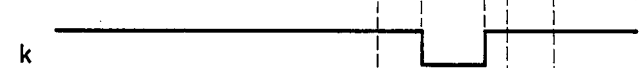 |
| FIG. 8G | | ℓ |  |
DOWN COUNT VALUE  N→N−n
| FIG. 8H | TBC HD | m | 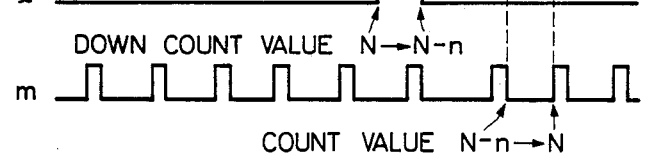 |
COUNT VALUE  N−n→N

REPRODUCING APPARATUS OF A VIDEO DISC PLAYER

BACKGROUND OF THE INVENTION

The present invention relates to a video player, especially to a reproducing apparatus of the video disc player which is suitable for a special reproduction of, for example, a still, a fast forward, a slow, a reverse reproduction and so on.

The video disc player is well known as a player for reproducing a video signal by irradiating a laser beam on a disc having information pits. In case of reproducing from a constant angular velocity disc (CAV disc) on which horizontal synchronizing signals and vertical synchronizing signals in the video signals are recorded aligned in a radial direction of the disc, it is well known that special reproductions, for example, a fast forward reproduction, a slow reproduction, a reverse reproducing and so on can be done by jumping a laser spot to a neighboring track on the disc by force of a track jump.

However, a recorded time on one side of the CAV disc is about 30 minutes. Instead of the CAV disc, a constant line velocity type disc (CLV disc) is manufactured as a long time playing disc which is usually used for a source recording movie programs. A recordable time on one side of the CLV disc is about twice as that of the CAV disc. However, in the CLV disc, the horizontal synchronizing signals and vertical synchronizing signals are not aligned in the radial direction.

Furthermore, a video signal reproduced from the video disc by the video disc player contains time base fluctuations due to an off-center of a rotation of the disc. A time base corrector (TBC) including a variable delay element such as a charge coupled device (CCD) corrects the time base fluctuation. A rotational speed of the disc is controlled by a feedback loop.

A CLV control of the video disc player is known, for example, by U.S. Pat. No. 4,223,349.

In the CLV disc, the special reproduction described above is not possible, since the synchronizing signals of the video signal are not aligned in the radial direction of the disc, and even if the laser spot jumps to the neighboring track, the reproduced synchronizing signal of the video signal are not continuous, and the disturbance of the synchronization occurs on a TV monitor.

Further, in case of trying the special reproduction by a track jump, at every time of the track jumps, the discontinuity of the synchronization of the reproduced video signal occurs, and the control system of the TBC becomes in a non-stabilized state, and it is not possible to obtain a reproduced video signal having a stabilized time base.

SUMMARY OF THE INVENTION

An object of the present invention is to provide a reproducing circuit of a video disc player which make possible the special reproduction from the CLV disc.

In accordance with the present invention, a field memory having a capacity of about one (1) field of the video signals is used for the special reproduction from the CLV disc.

The field memory is constructed so as to read-in and write-out simultaneously. A writing-in period for the memory is synchronized with the vertical synchronizing signal of the reproduced video signal, and is given at least a period of time of one (1) field after an order of the still or the special reproduction or the track jump.

Further, immediately after the track jump, a phase difference between a reference synchronizing signal and the reproduced horizontal synchronizing signal is detected, and a phase of the reproduced horizontal synchronizing signal is adjusted to a phase of the reference horizontal synchronizing signal.

At the time of writing the reproduced video signal into the memory, an address of the memory is determined by using a synchronizing signal of the video signal. Therefore, at the time of reading out the memorized video signal from the memory, the problem of non-continuity of the synchronizing phase is solved by using a continuous synchronizing signal.

After a track jump, the phase of the reference horizontal synchronizing signal of the TBC is adjusted to the phase of the reproduced horizontal synchronizing signal immediately after the track jump. Therefore, it is possible to shorten a transient response period of the time base correcting system. During the stabilizing period of the servo system, a reproduced video signal of one field is written in the memory, the video signals which have continuous synchronizing phase can be output from the memory, and the special reproduction such as the still, the fast forward and so on becomes possible.

BRIEF DESCRIPTION OF THE DRAWINGS

FIG. 5 illustrates a detailed circuit diagram of the TBC.HD generator of the present invention;

FIGS. 6A–6E illustrate time charts at various parts in FIG. 5;

FIG. 7 illustrates another detailed circuit diagram of the TBC.HD generator of the present invention;

FIGS. 8A–8H illustrate time charts at various points in FIG. 7;

DETAILED DESCRIPTION OF THE PREFERRED EMBODIMENTS

An embodiment of the present invention is described hereinafter with reference to the attached drawings.

Figure 1:
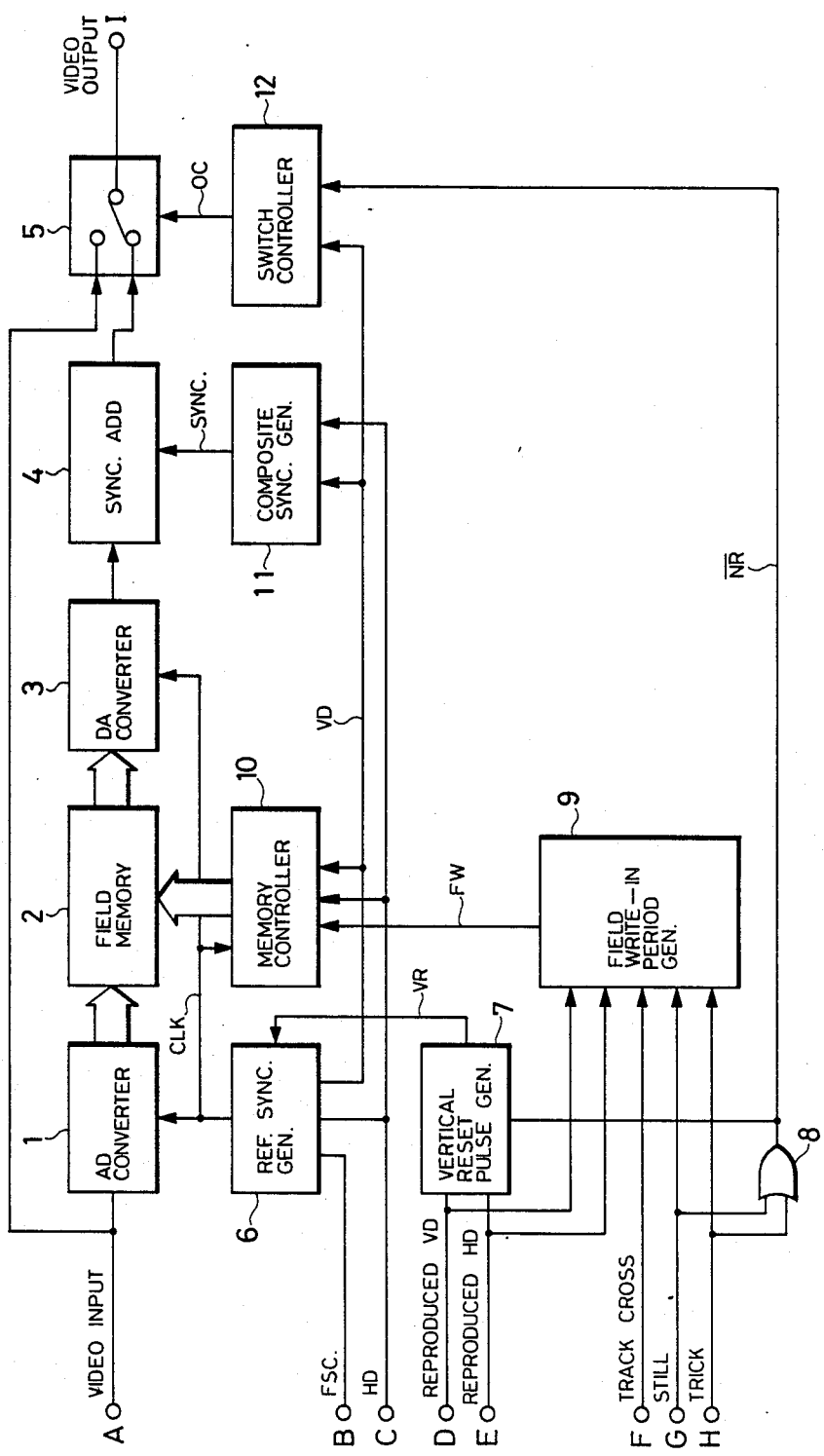
FIG. 1 illustrates a block diagram of a video disc player in accordance with one embodiment of the present invention.

FIG. 1 shows a block diagram of an embodiment of the present invention. In FIG. 1, the reference numeral 1 indicates an A/D converter, the numeral 2 indicates a field memory, the numeral 3 indicates a D/A converter, the numeral 4 indicates a synchronizing signal adder, the numeral 5 indicates an output switch, the numeral 6 indicates a reference synchronizing signal generator, the numeral 7 indicates a vertical reset pulse generator, the numeral 8 indicates an OR gate the numeral 9 indicates a field write-in period generator, the numeral 10 indicates a control circuit for the field memory 2, the numeral 11 indicates a composite synchronizing signal generator, the numeral 12 indicates a switch control circuit of the output switch 5, and the reference letters (A) to (I) indicate input/output terminals.

Figure 2:
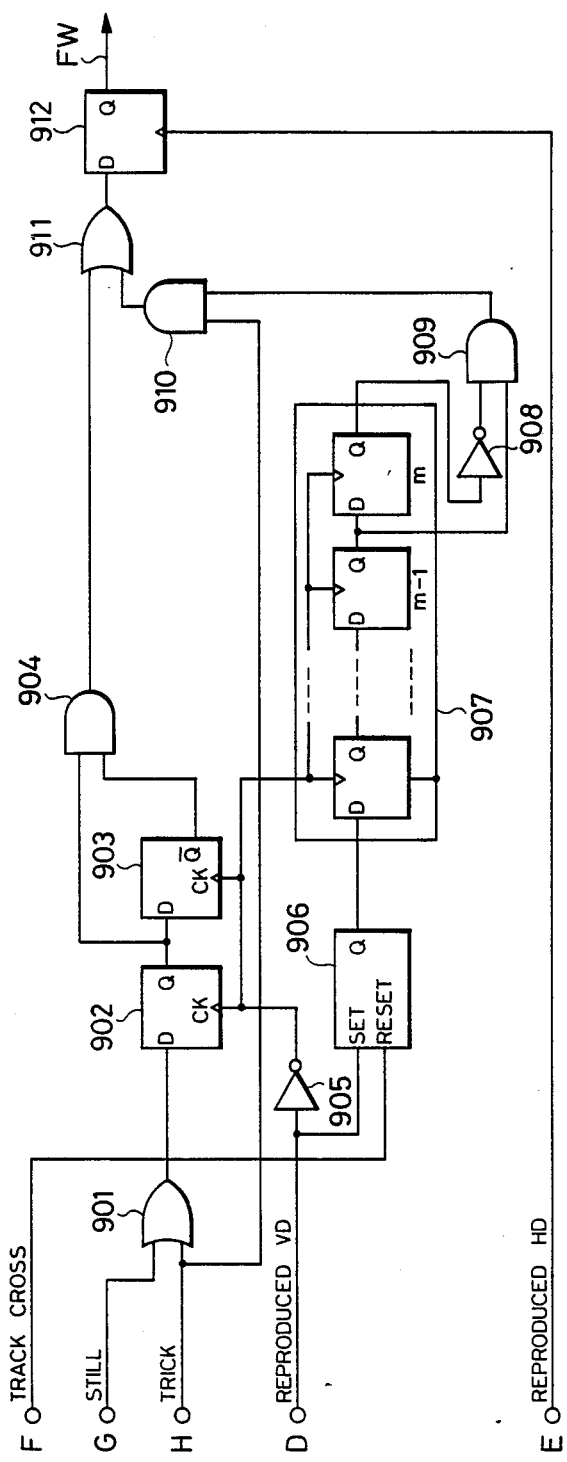
FIG. 2 illustrates a detailed circuit diagram of a field write-in period generator shown in the embodiment of FIG. 1.
Figure 3:
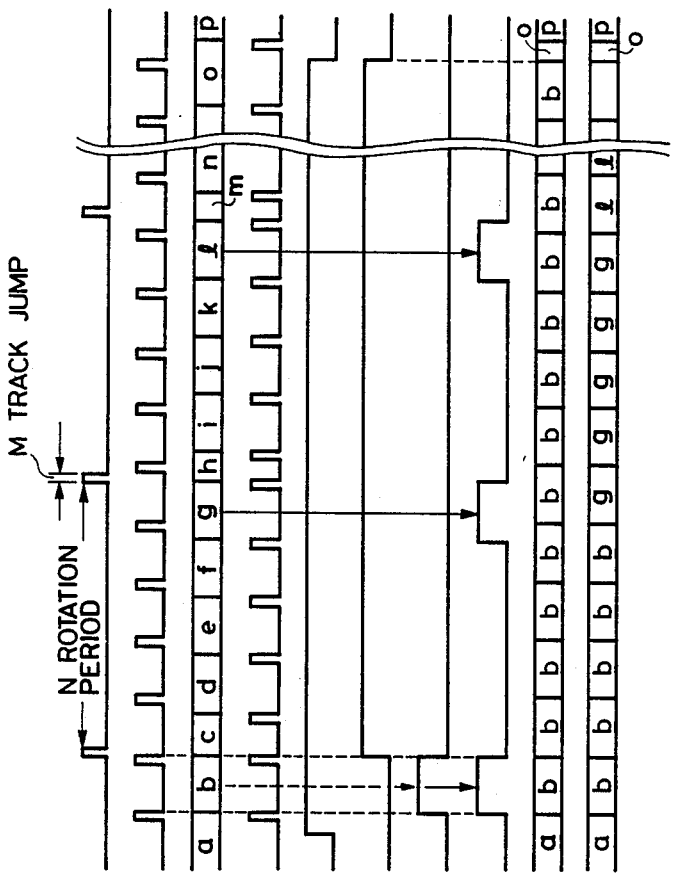
FIGS. 3A–3J illustrate time charts of the first embodiment shown in FIGS. 1 and 2.

FIG. 2 shows a detailed circuit diagram of the field write-in period generator 9 shown in FIG. 1. FIGS. 3A–3J show timing charts of the embodiment shown in FIGS. 1 and 2.

A video signal is inputted via the terminal (A). In the A/D converter 1, the input video signal is sampled with a clock signal (CLK) having a frequency of four times of that of a color sub-carrier generated from the reference signal generator 6, and is converted to a digital signal. The reference signal generator 6 generates a continuous signal (Fsc) having the same frequency as the color sub-carrier and a horizontal drive synchronizing signal (HD). These signals (Fsc & HD) are supplied to a known motor servo system and a time base corrector system which are not shown in the drawings for synchronizing a color sub-carrier and a horizontal drive synchronizing signal in the input video signal with the reference signals Fsc and HD respectively.

The digitized video signal is written-in the field memory 2. The field memory 2 is used for temporarily storing a video signal. Instead of the field memory 2, an analog memory device such as a CCD can be used without the A/D converter 1 and the D/A converter 3. A write-in period of the field memory 2 is provided by the field write-in period memory 9, the operation thereof being explained with regard to FIGS. 2 and 3.

In case of a still order signal giving a still mode or a trick order signal indicating a special reproduction mode such as a first forward, a slot forward and so on, order signals are input through an OR gate 901 as shown in FIG. 3E. Latch circuits 902, 903 and an AND gate 904 serve for generating a write-in period signal having a length of one field after a reproduced vertical drive synchronizing signal (reproduced VD) just after the ordering signal. The output signal from the AND gate 904 passes through an OR gate 911, is synchronized with a reproduced horizontal drive synchronizing signal (reproduced HD) at a latch circuit 912, and is output as a write-in period signal (FW) as shown in FIG. 3G.

At the still mode, a video signal is memorized in the field memory 2 for a single write-in period, and the memorized contents are read out continuously. As a timing for latching at the D-type flip-flop 912, it is possible to use a horizontal synchronizing signal which is a reference to a time base corrector system, which is tolerant of a noise such as a drop-out instead of the reproduced HD.

At the trick mode, a video signal stored in the field memory 2 is rewritten in response to an input signal from the terminal (F) which indicates a track crossing, for example, a track jump signal shown in FIG. 3A, which jumps a laser beam from one track to another track by force, or a loop-off order signal for a tracking servo loop. A timing signal of the reproduced HD just after the track jump is obtained by a RS-type flip-flop 906. A shift resistor 907 outputs a write-in period signal (FW) shown in FIG. 3H during a period of m-th field counted from after the track jump.

The reason of the m-th field signal being selected as a write-in period signal is to obtain a waiting time until the motor servo system and/or the jitter servo system stabilizes after jumping, because phase rows of the synchronizing signals of the video signals between tracks are not aligned in the CLV disc.

Therefore, as shown in FIGS. 3A–3J, a special reproduction of the speed of $(1 \pm M/N)$ can be obtained by the track jump of M tracks in a period of N revolutions of the disc. In the above equation, (+) indicates a forward reproduction, and (−) indicates a reverse reproduction.

If a memorizing capacity of the field memory 2 is expanded to a capacity of one frame which corresponds to two fields, a frame still reproduction by memorizing video signals of one frame can be effected by using a length of one frame of write-in period signal (FW).

In FIG. 1, the memory controller 10 addresses a start of the write in period signal (FW) in an address of "0" of the field memory in response to the signal (FW), and continuously gives writing address at each clock signal and controls storing of information at a position on a picture at a specified address of the field memory.

A reading-out operation is effected based on a reference vertical drive synchronizing signal (VD) produced by the reference synchronizing signal generator 6, and a continuous figure can be obtained.

In a normal mode of a reproduction, the reference synchronizing signal generator 6 receives a vertical reset pulse (VR) for adjusting a phase of a reproduced VD with that of a reference VD. The synchronizing signal adder 4 adds a composite synchronizing signal on a video signal and sends through the output as a normal video signal and, at the special reproduction mode, outputs a video signal stored in the field memory 2. The output switch 5 is controlled by the switch control circuit 12.

As described above, since a writing-in operation to the field memory 2 is effected by the reproduced VD and the reproduced HD of the reproducing video signal, and a reading-out operation is effected by the reference VD and reference HD, even if a phase of the video signal becomes discontinuous by a track jump, the phase of the output signal from the field memory 2 becomes continuous based on the reference VD and reference HD, and a stabilized picture on a TV monitor can be provided.

Figure 4:
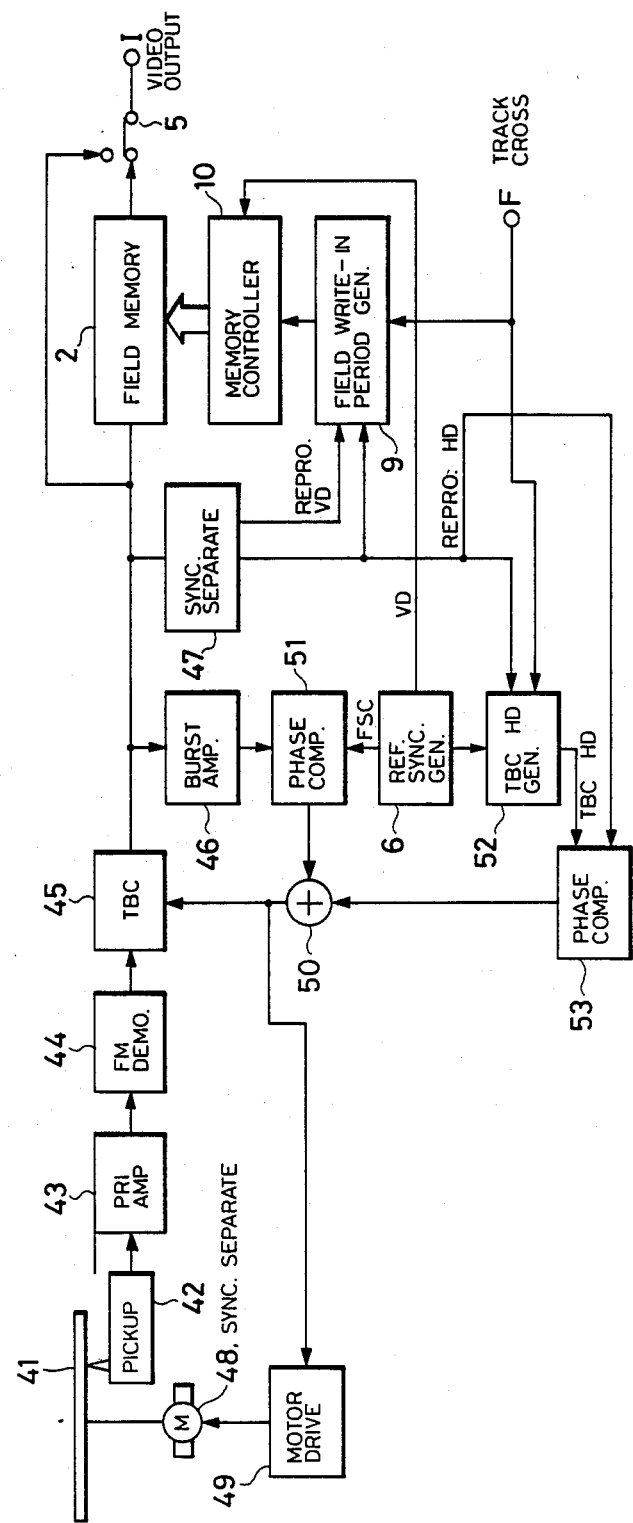
FIG. 4 illustrates a block diagram of a video disc player in accordance with another embodiment of the present invention.

Another embodiment of the present invention is illustrated in FIG. 4. A signal read-out from a disc 41 by a pick-up 42, and amplified by a pre-amplifier 43 is demodulated by a FM demodulator 44 as a reproduced video signal. A time base error of the reproduced video signal is corrected by a time base corrector (TBC) 45 which consists of, for example, a variable delay element such as a CCD and VCO. The corrected video signal normally bypasses the field memory 2, and outputs through the switch 5. At the time of the special reproduction, the video signal is stored in the field memory 2, and is read-out from it. In FIG. 4, an A/D converter, a synchronizing signal adder and a D/A converter, as shown in FIG. 1, are not necessary for a trick reproduction. A color burst signal is separated from a reproduced video signal by a burst amplifier 46, and is phase-compared with a reference color sub-carrier reproduced from a reference synchronizing signal generator 6 in a phase comparator 51. A phase comparator 53 compares a phase of a reproduced horizontal synchronizing signal (reproduced HD) separated by a synchronizing separating circuit 47 with a phase of a reference horizontal synchronizing signal (reference HD). An output of the phase comparator 53 is added by an adder 50, and an added signal is supplied to the TBC 45 and a motor driver circuit 49 so as to eliminate a time base fluctuation in the reproduced video signal.

A TBC.HD generator 52 generates a horizontal synchronizing signal (TBC.HD) for controlling the reproduced HD to be at steady motion stabilizing points of the TBC.

FIG. 5 shows a detailed circuit diagram of the TBC.HD generator. FIGS. 6A-6E indicate timing charts at various points (a) to (e) shown in FIG. 5. A track cross signal (a), shown in FIG. 6A, applied to a clock input of a D-type flip-flop through an inverter 501, and a gate signal (c) shown in FIG. 6C turns to "High" level in response to a trailing edge of the track cross signal (a). A gate signal (c) is applied to one of the inputs of a NAND gate 503, and the NAND gate 503 generates a reset pulse (d), shown in FIG. 6D, in response to a leading edge of a reproduced synchronizing signal (b) supplied to another input of the NAND gate 503 during a "High" level of the gate signal (c). The reset pulse (d) is applied to a clear input of the D-type flip-flop 502, and turns the gate signal (c) to a "Low" level. The reset pulse (d) also is applied to a reset input of the counter 504, and resets the contents of the counter 504 to an initial value. The counter 504 counts clock signals CLK generated from the reference synchronizing signal generator 6, and the counted value changes and turns back to the started value after one horizontal period. Decoders 505, 506 trigger a SR-type flip-flop 507 at a specified timing when the counter 504 generates a predetermined value, and the SR-type flip-flop 507 outputs the TBC.HD signal (e).

According to the above described construction, at every time of completing the track jump motions, in other words, at every time of returning the track cross signal to the "Low" level, the phase of the reference synchronizing signal can be adjusted to the phase of the reproduced horizontal synchronizing signal. The phase difference between the reproduced and the reference HD signals accompanied with a track jump at the reproduction of the CLV disc does not generate on the surface, and the phase adjustment in motor servo system and the TBC finishes in an instant. Since a distortion of a picture and a color shading do not generate at the time of writing-in a video signal into the memory from the start point of a next field of the video signal, the special reproduction such as a slow reproduction and a fast forward can be realized, and an establishment of the speed can be done closely.

FIG. 7 shows another circuit diagram of the TBC.HD generator 52. FIGS. 8A-8H show timing charts at various points (f) to (m) in FIG. 7. The TBC.HD generator 52 consists of a phase difference detecting circuit 70 and a phase shift circuit 71. The phase difference detecting circuit 70 consists of a portion detecting a phase difference between the reference horizontal synchronizing signal HD (g) and the reproduced horizontal synchronizing signal HD (h) just after the track jump which comprises inverters 701, 705, D-type flip-flops 702, 703, 704, and an AND gate 706, and a portion converting the phase difference into a number of clock pulses which comprises a down counter 707 and a latch circuit 708. The down counter 707 counts one cycle at every N number of clock pulses of one horizontal scanning period. The counter 707 receives an output signal (l) of the AND gate 706 at an enable terminal, and counts a number of (n) which corresponds to a phase difference between the reference HD and the reproduced HD, and supplies data to a preset data input of the counter 712 in the phase shift circuit 71 through the latch circuit 708. The counter 712 also counts one cycle at every N number of clock pulses and loads a preset data input value at every leading edge of the reference HD detected by the edge detecting circuit 711. The decoders 713 and 714 trigger the SR-type flip-flop 715 at a timing when a data output of the counter 712 indicates a predetermined value. If the decoded values of the decoders 713 and 714 is set so as that a signal appearing at the output terminal (m) of the SR flip-flop 715 when the value of (n) is zero has a same phase with the reference HD, the SR-type flip-flop 715 outputs a TBC.HD shifted in phase so as to equal to a phase of the reproduced HD just after arrival of the track cross signal.

The above-described phase adjustment just after the track jump can be effected only in the special reproduction mode of the CLV disc.

Figure 9:
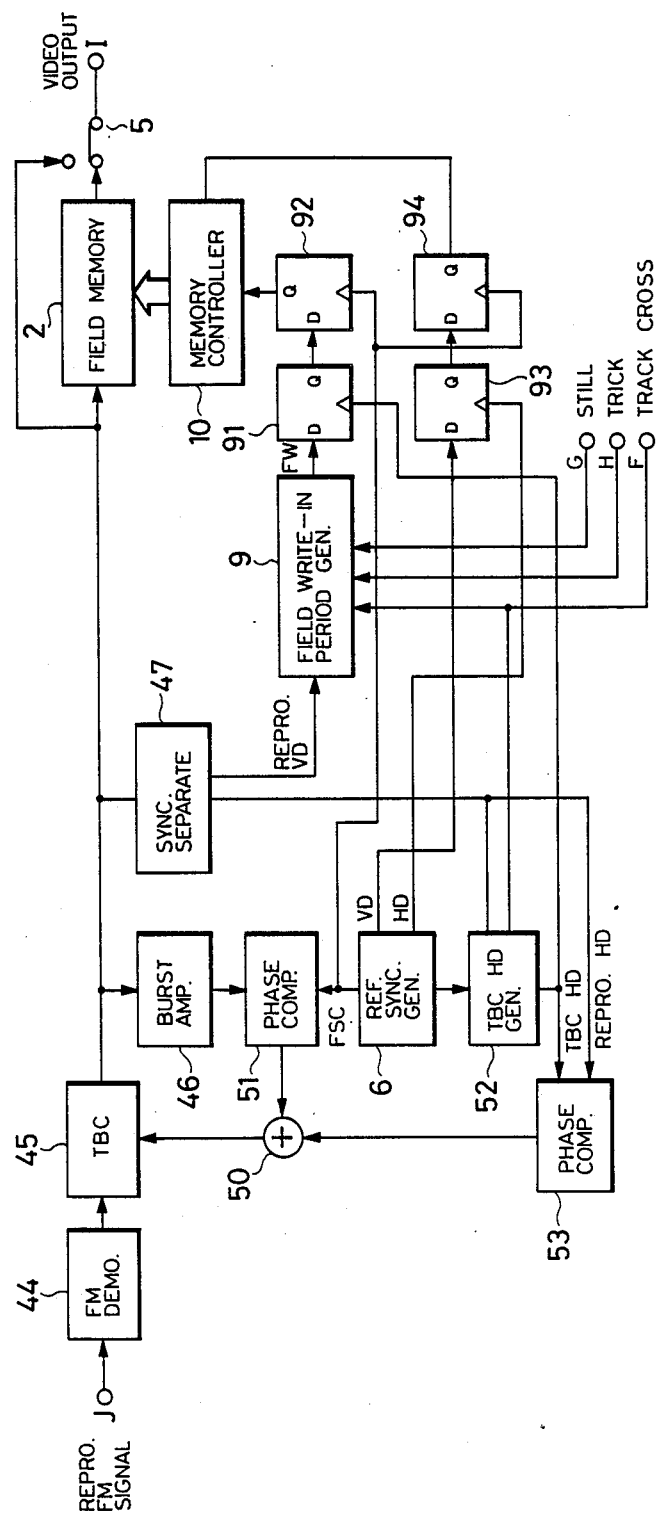
FIG. 9 illustrates a block diagram of a further embodiment of the present invention.

The further embodiment of the present invention is illustrated in FIG. 9. The same reference numerals as utilized in FIGS. 1 and 4 indicate components having the same function as described in the embodiments in FIGS. 1 and 4.

As shown in FIG. 2, the field write-in period generator 9 receives the still order or the trick order signal from a system control circuit (not shown) at terminals (G), (H), and generates the write-in period signal (FW) having at least one field period which synchronizes with the reproduced VD. In FIG. 9, the flip-flop latch circuit 912, shown in FIG. 2, is replaced with a first latch circuit 91.

The write-in period signal FW is synchronized with the TBC.HD signal at the first latch circuit 91, and is synchronized with the reference sub-carrier signal (Fsc) at a second latch circuit 92, and is supplied to the memory controller 10. The TBC 45 acts to synchronize the reproduced video signal with the TBC.HD signal and the reference sub-carrier signal (Fsc). This function of the TBC 45 can produce the same effect as synchronization of the timing of the signal sent out to the memory controller directly with the reproduced HD or the color burst signal of the reproduced video signal. The TBC 45 can store the reproduced video signal with a specified phase of the sub-carrier at a specified address in the field memory 2. As a result, by utilizing the output read out from the field memory 2, the continuity of the phase synchronization of the reproduced video signal can be maintained. The continuity of the phase of the sub-carrier can also be maintained. Since a color burst signal in the reproduced HD or the reproduced video signal itself is not used, a stabilized writing-in timing can be obtained without an influence of a noise such as a dropout in the reproduced video signal.

A timing read out from the field memory 2 can be obtained by synchronizing the reference vertical sync. signal VD generated from the reference sync. signal generator 6 with the reference horizontal sync. signal HD and the reference sub-carrier (Fsc) respectively at a third latch circuit 93 and a fourth latch circuit 94. If the reference vertical sync. signal VD has already been synchronized with the HD, the third latch 93 is not necessary. The video signal read out from the field memory 2 has the same phase as the sub-carrier, and the color synchronization is not off even when changing the switch 5 for turning from the normal mode to the special mode or the reverse.

Figure 10:
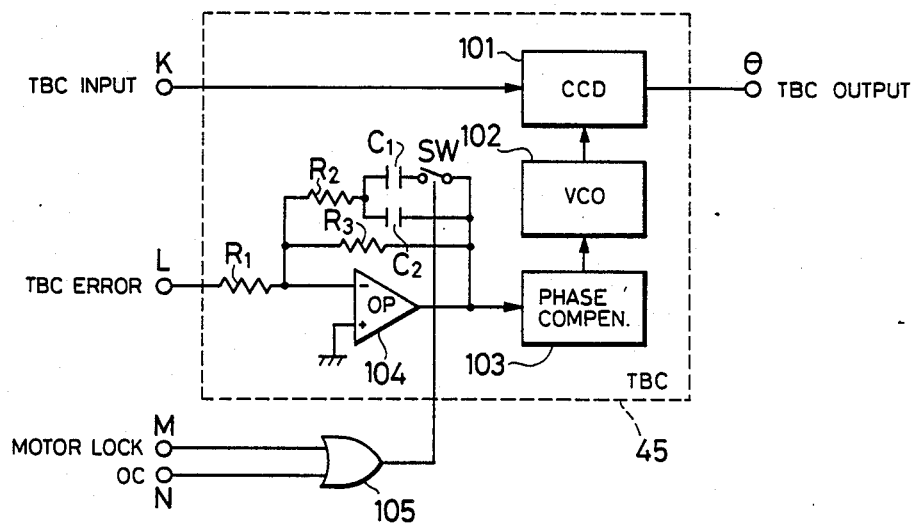
FIG. 10 illustrates a detailed circuit diagram of the time base corrector TBC of the present invention.

FIG. 10 shows a detailed circuit diagram of the time base corrector TBC 45. The time base error signal output from the adder 50 inputs to the terminal (L). A variable gain amp. 104 consists of an operational amplifier (OP), a switch SW, resistors R1 to R4, and condensers C1, C2. The TBC 45 controls the delay time of a CCD 101 by the variable gain amp. 104, a phase compensation circuit 103 and a VCO 104 so as to correct the time base error.

The amp. 104 receives a motor-lock signal from a terminal (M) during unlocked period of the motor or a switching signal (OC) from a terminal (N) during the special reproduction period through an OR gate 105, and decreases a gain thereof around a rotational frequency of the disc of about 10 Hz to 30 Hz by turning on the switch (SW). The locked-in motion of the TBC can be effected in a short term even after the track jump.

Figure 11:
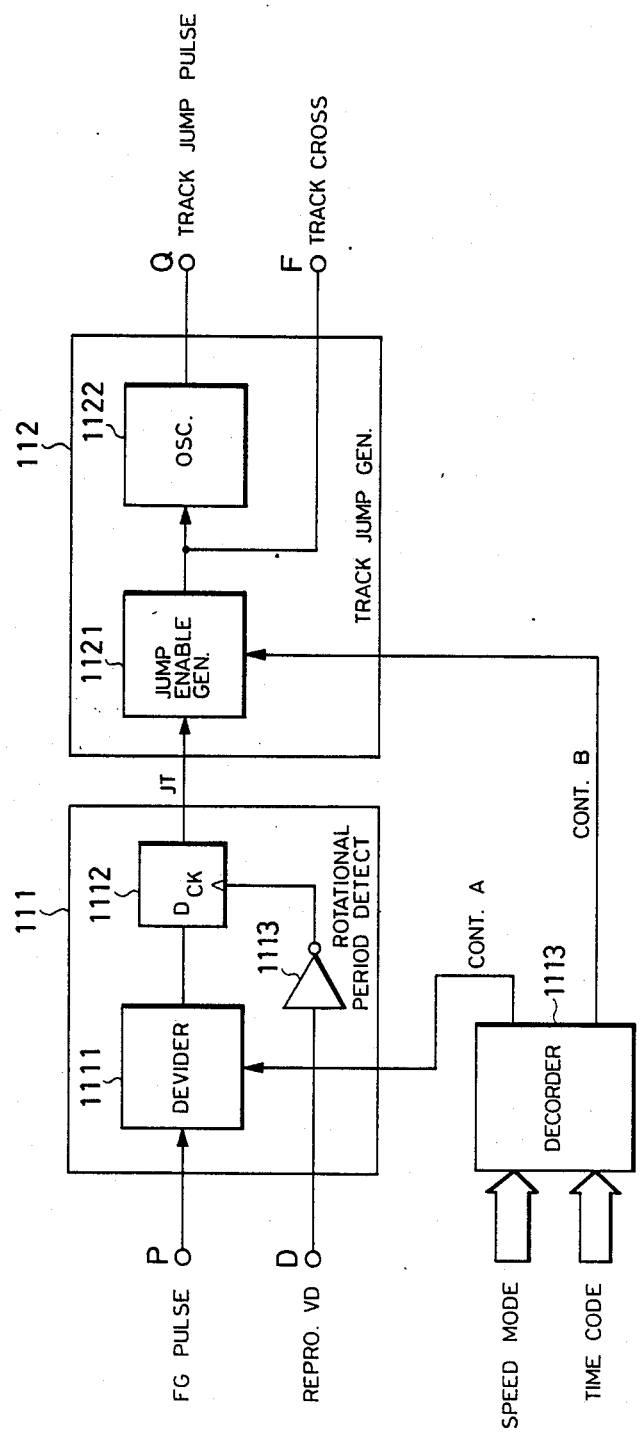
FIG. 11 illustrates a block diagram of a still further embodiment of the present invention.

FIG. 11 shows a still further embodiment for setting the speed of the special reproduction, which comprises a rotational period detector 111, a track jump pulse generator 112 and a decoder 113.

FG pulses generated by a frequency generator attached to the disc motor, which are not shown in the drawing, are input through a terminal (P). The number of the FG pulses generated per one revolution of the disc is predetermined. The FG pulses input to the rotational period detector 111 is divided by the divider 1111 for detecting a rotational period of the disc motor. Namely, setting the numbers of the FG pulses per one revolution be (L), the rotational period (R) of the disc is detected as (L/N). The dividing ratio (1/N) is controlled by control signal (CONT.A) generated from the decoder 113 for being able to detect any rotational period. The output signal of the divider 1111 is synchronized with the reference VD input through the terminal (D) at a D-type flip-flop 1112, and is supplied to the track jump pulse generator 112 as a track jump timing signal (JT).

A jump enable period generator 1121 forming part of the track jump pulse generator 112 sets an oscillator 1122 in an enable state in response to the track jump timing signal (JT). The enable state enables starting of an oscillation. The oscillation is continuous when the output (EN) of the generator 1121 is "High" level, and is supplied to the tracking servo system of the player from a terminal (Q) a sa track jump pulse for causing the track jump of the laser spot. Therefore, by varying a pulse width of the jump enable signal (EN) by a second control signal (CONT.B) generated from the decoder 113, the number of the track jump pulses are varied, and the number (J) of the track jump can be controlled. The jump enable signal (EN) is output from a terminal (F) as the track signal.

Letting the rotational period of the disc be (R) revolutions, the number of tracks jumped be (J), a reproducing speed is determined as (1+J/R). Herein, (+) indicates the forward jump, and (−) indicates the reverse jump. The decoder 113 outputs the control signal (CONT.A) defining the rotational period (R) and the control signal (CONT.B) defining the jump track number (J) in response to a speed mode from the system control circuit.

In the CLV disc, since the field numbers of the video signal recorded in one revolution increases in outer areas of the disc, the smoothness of the motion of the picture can be improved by decreasing the values (J), (R) in maintaining with the ratio (J/R) at a constant ratio in the outer area. The decoder 113 controls the values (J), (R) such as R=J=1 in an inner area, and R=J=1 in the outer area at twice fast forward mode in reference to a time code.

Figure 12:
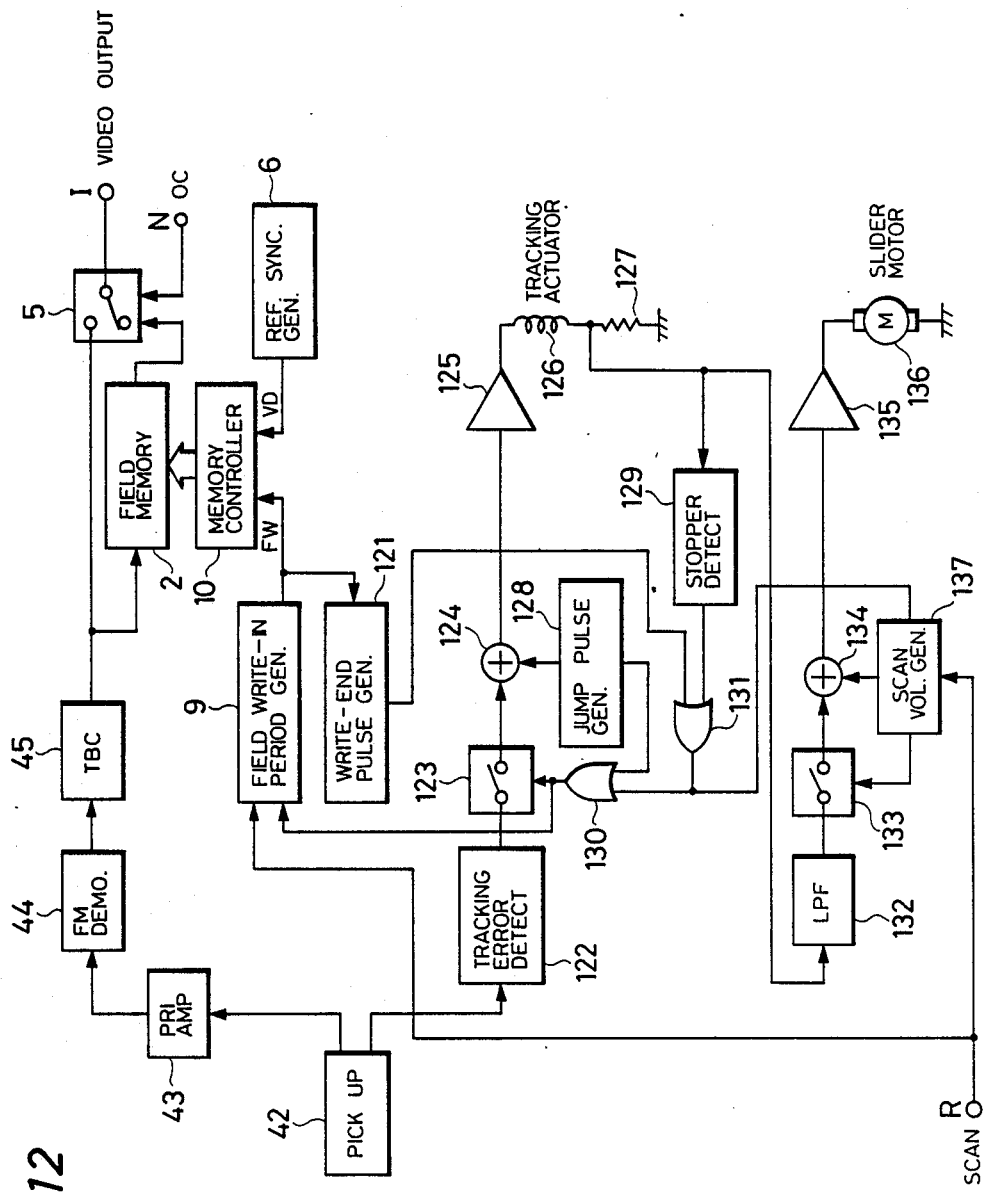
FIG. 12 illustrates a block diagram of another embodiment of the present invention.

FIG. 12 shows a further embodiment suitable for a high speed reproduction. The same reference numerals are utilized for these components having the same function as described in FIGS. 1 and 4. In FIG. 12, the reference numeral 121 indicates a write end pulse generator for generating a pulse indicating an end of the writing-in period to the field memory 2, the reference numeral 122 indicates a tracking error detector, the reference numeral 123 indicates a switch for turning on/off the tracking servo loop, the reference numeral 124 indicates an adder, the reference numeral 125 indicates a power amplifier, the reference numeral 126 indicates a tracking actuator, the reference numeral 127 indicates a feedback resistor, the reference numeral 128 indicates a track jump pulse generator, the reference numeral 129 indicates a stopper detector for detecting and limiting a limit of a movable range of the track servo, the reference numerals 130, 131 indicates OR gates, the reference numeral 132 indicates a low pass filter (LPF) for picking up a low frequency component in the tracking error voltage in the feedback resistor 127, and for getting a driving signal for a slider motor described later, the reference numeral 133 indicates a switch for turning on/off a slider servo loop, the reference numeral 134 indicates an adder, the reference numeral 135 indicates a power amplifier, the reference numeral 136 indicates a slider motor, the reference numeral 137 indicates a scan voltage generator for generating a signal for driving the slider motor 136, and moving the pick up by force.

An operation of the high speed reproduction mode is explained below. A terminal (R) is an input terminal of the mode order signal. The field write-in period generator 9 generates a write-in period signal (FW) having a "High" level during about one field period from the reproduced vertical sync. signal (VD) just after receiving the order signal, and the reproduced video signal is written into the field memory 2 in response to the signal (FW). Next, the switch is changed to the field memory side by the control signal (OC) input from a terminal (N), the video signal read out from the field memory being sent through a terminal (I). The switch 133 is turned off in response to the control signal (OC), the slider motor 136 is driven by the scan voltage generator 127 for moving a pick-up at about a constant speed. The end of the write-in period is detected at the write and pulse generator 121, and the write end pulse is generated therefrom.

The write end pulse turns off the switch 123 for opening the tracking servo loop, and for returning the tracking actuator 126 to neutral points in a dynamic range automatically. The stopper detector 129 receives a voltage across the feedback resistor 127, and outputs a detecting signal for limiting a dynamic range of the tracking servo electrically. The detecting signal from the detector 129 and the jump pulse generated by the jump pulse generator 128 also turns off the switch 123. After returning to the neutral point, the switch 123 is turned on again, the generator generates the write-in period signal (FW) having a length of about one field from the vertical sync. signal again after waiting a sufficient time for absorbing the time base error generated after the track jump by the TBC 45. By the signal (FW), the contents of the field memory L is rewritten. During a rewriting period, the video signal is read out from the memory 2, and reproduced in the fast forward mode on the TV monitor as a synchronization continuous signal for the CLV disc.

In accordance with the above-described embodiment, it is possible to move the laser beam across the tracks little by little since the track crossing is started without a loss of time just after the end of the write-into the memory 2. Therefore, the speed error on the time base after the tracking crossing becomes small, and the regulation time of the TBC 45 is shortened. The smooth movement of the reproduced picture can be obtained.

Figure 13:
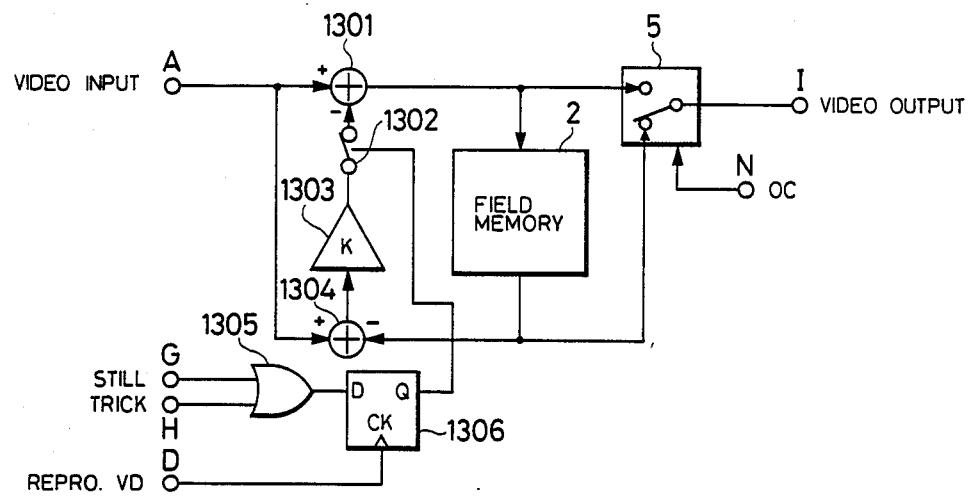
FIG. 13 illustrates a block diagram of a further embodiment of the present invention.

FIG. 13 shows a block diagram of another embodiment for using the field memory as a noise reducer utilizing a field interrelation in a normal producing mode. The memory 2 operates as a fixed delay line. The noise reducer of field circular type consists of the field memory 2, an adder 1301, a multiplier 1303, and an adder 1304. A switch 1302 turns on for closing a loop of the noise reducer through an OR gate 1305 and a D-type flip-flop 1306 in the normal mode. In the special mode, the switch 1302 turns off for inhibiting function of the adder 1301.

Figure 14:
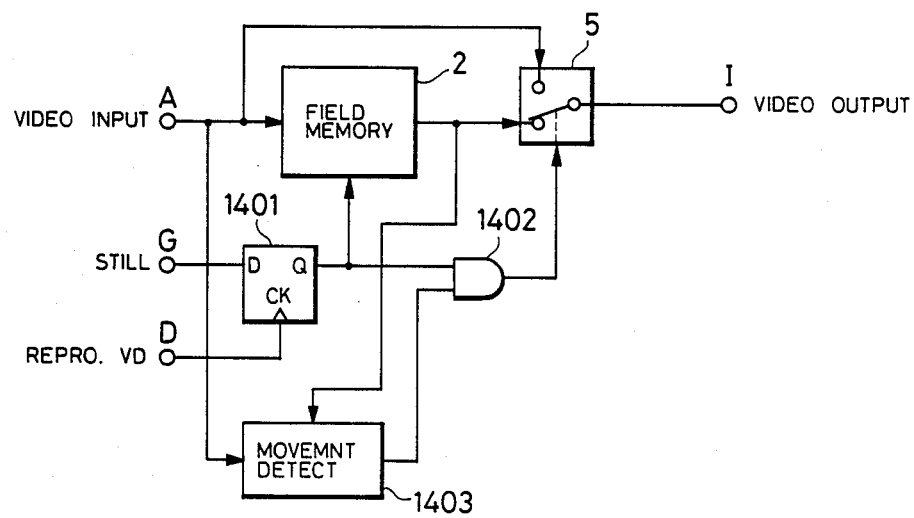
FIG. 14 illustrates a block diagram of a still further embodiment of the present invention.

FIG. 14 shows a block diagram of a further embodiment for the still reproduction from the CAV disc with a high quality. In that mode, only one field information in two fields is stored in the memory 2. A movement detector 1403 judges a movement of the picture whether a difference between an input signal and an output signal of the memory 2 is large or not. The judgment result is applied to the switch 5 through an AND gate 1402 for selecting the input signal to the memory 2 in case of no movement, and the output signal from the memory 2 in case of movement. For the picture having a large movement, a high quality reproduced picture can be obtained because the information in the memory is selected.

What is claimed is:

1. A reproducing apparatus of a video disc player for reproducing a video signal from a CLV type disc having tracks thereon in a special mode of reproduction comprising:
    field memory mean having a storing capacity of about at least one field of video signals;
    first reference synchronizing signal generator means for generating at least a first reference synchronizing signal including a first reference horizontal synchronizing signal and a first reference vertical synchronizing signal;
    means for writing reproduced videos signals in said field memory means synchronized with a reproduced horizontal synchronizing signal and a reproduced vertical synchronizing signal; and
    means for reading the stored signals in said field memory means based on the first reference synchronizing signals generated from said first reference signal generator means;
    wherein said first reference synchronizing signal generator means synchronizes said reproduced vertical synchronizing signal with said first reference vertical synchronizing signal.

2. The apparatus according to claim 1, further comprising switching means for selecting one of a signal applied to an input of said field memory means and a signal provided from said field memory means.

3. The apparatus according to claim 1, further comprising:
    means for generating a composite synchronizing signal synchronized with said first reference synchronizing signal; and
    means for changing a synchronizing signal of said video signal read out from said field memory means over said composite synchronizing signal in at least a vertical period.

4. The apparatus according to claim 1, further comprising:
    means for detecting a period of rotation of said disc;
    means for generating a track jump pulse; and
    means for decreasing a timing period (R) of a track jump and the number (J) of tracks in an outer area of said disc so as to maintain a ratio (J/R) substantially constant.

5. The apparatus according to claim 1, further comprising:
    means for rewriting contents stored in said field memory means at least once in response to a track crossing signal indicating a track crossing; and
    means for crossing a track again after detecting an end of writing-in.

6. The apparatus according to claim 5, wherein said crossing means turns off a tracking servo loop.

7. The apparatus according to claim 1, wherein said field memory means includes means for operating as a fixed delay line and for reducing a noise component in said reproduced video signal.

8. A reproducing apparatus of a video disc player for reproducing a video signal from a CLV type disc having tracks thereon in a special mode of reproduction comprising:
    field memory means having a storing capacity of about at least one field of video signals;
    first reference synchronizing signal generator means for generating at least a first reference synchronizing signal including a first reference horizontal synchronizing signal and a first reference vertical synchronizing signal;
    means for writing reproduced video signals in said field memory means synchronized with a reproduced horizontal synchronizing signal and a reproduced vertical synchronizing signal;
    means for reading the stored signals in said field memory means based on the first reference synchronizing signals generated from said first reference signal generator means;
    time base correction control means for synchronizing said reproduced video signal with said first reference horizontal synchronizing signal and a reference sub-carrier;
    second reference synchronizing signal generator means for generating a second reference synchronizing signal; and
    means for correcting a phase of said second reference synchronizing signal so as to equalize a relationship in a steady state of a time base error controlling system to a relationship of said second reference synchronizing signal and said reproduced horizontal synchronizing signal in response to a track crossing signal indicating a track crossing has been effected.

9. The apparatus according to claim 8, wherein said second reference synchronizing signal generator means includes a reset pulse generator means for producing a reset pulse coinciding with a timing of said reproduced synchronizing signal in response to said track crossing signal so as to reset a phase of said second reference synchronizing signal.

10. The apparatus according to claim 8, wherein said second reference synchronizing signal generator means comprises:
- a phase shifting circuit for shifting a phase of said first reference synchronizing signal; and
- a phase difference detecting circuit for detecting a phase difference between said first reference synchronizing signal and said reproduced synchronizing signal just after receiving said track crossing signal;
- said second reference synchronizing signal generator means adjusting a phase shifting value for said phase shifting circuit in response to an output from said phase difference detecting circuit.

11. The apparatus according to claim 8, wherein said phase correcting means only corrects the phase of said second reference synchronizing signal when the CLV disc is reproduced.

12. The apparatus according to claim 8, further comprising means for varying a control gain of said time base correcting control means around a frequency of a rotation of said disc, said control gain being reduced in said special reproduction mode.

13. The apparatus according to claim 8, wherein said writing means comprises:
- a reference vertical signal generating circuit for generating a signal indicating a start of reading-out from said field memory means synchronized with said first reference synchronizing signal;
- a first latch circuit for latching a signal indicating a start of writing-in to said field memory means in synchronization with said reproduced vertical synchronizing signal at a timing of said second reference synchronizing signal;
- a second latch circuit for latching an output of said first latch circuit at a timing of said reference sub-carrier signal;
- a third latch circuit for latching said vertical synchronizing signal generated from said reference synchronizing signal generating means at a timing of said reference sub-carrier signal; and
- a fourth latch circuit for latching an output of said third latch circuit at a timing of said reference sub-carrier signal;
- said writing means starting a signal writing-in synchronization with said output of said second latch circuit, and starting a signal reading-out in synchronization with said output of said fourth latch circuit.

14. The apparatus according to claim 8, further comprising switching means for selecting one of a signal applied to an input of said field memory means and a signal provided from said field memory means.

15. The apparatus according to claim 8, further comprising:
- means for generating a composite synchronizing signal synchronized with said first reference synchronizing signal; and
- means for changing a synchronizing signal of said video signal read out from said field memory means over said composite synchronizing signal in at least a vertical period.

16. The apparatus according to claim 8, further comprising:
- means for detecting a period of rotation of said disc;
- means for generating a track jump pulse; and
- means for decreasing a timing period (R) of a track jump and the number (J) of tracks in an outer area of said disc so as to maintain a ratio (J/R) substantially constant.

17. The apparatus according to claim 8, further comprising:
- means for rewriting contents stored in said field memory means at least once in response to a track crossing signal indicating a track crossing; and
- means for crossing a track again after detecting an end of writing-in.

18. The apparatus according to claim 17, wherein said crossing means turns off a tracking servo loop.

19. The apparatus according to claim 8, wherein said field memory means includes means for operating as a fixed delay line and for reducing a noise component in said reproduced video signal.

* * * * *